UNITED STATES PATENT OFFICE.

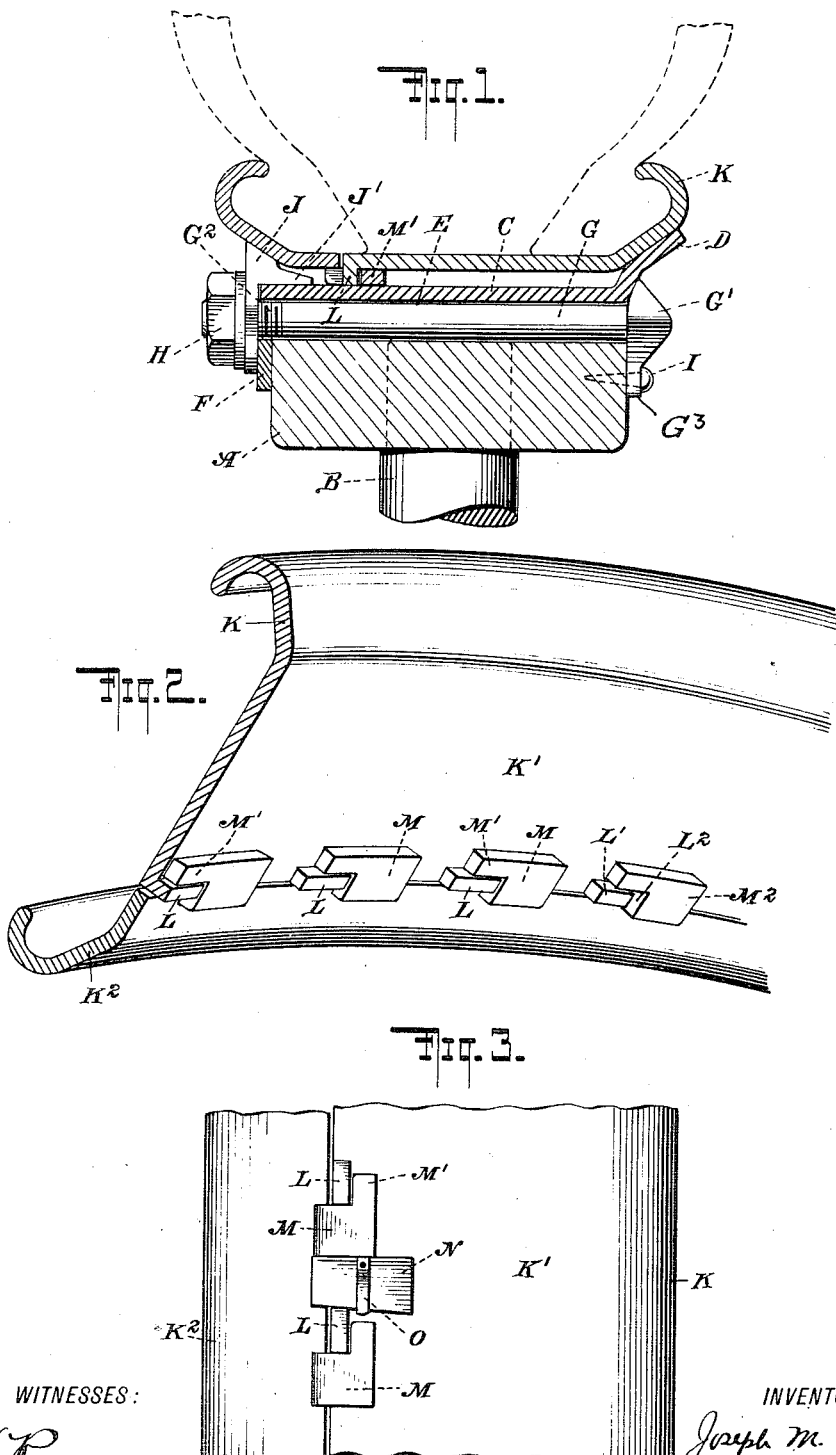

JOSEPH M. GILBERT, OF MOUNT VERNON, NEW YORK.

AUTOMOBILE-WHEEL.

979,468.     Specification of Letters Patent.     Patented Dec. 27, 1910.

Application filed August 3, 1909. Serial No. 511,025.

*To all whom it may concern:*

Be it known that I, JOSEPH M. GILBERT, a citizen of the United States, and resident of Mount Vernon, Westchester county, New York, have invented certain new and useful Improvements in Automobile-Wheels, of which the following is a specification.

My invention relates to automobile wheels and particularly to devices for permitting the usual pneumatic tire to be readily attached to and removed from said wheel.

The object of my invention is to provide a demountable tire-carrying rim made of separable sections each provided with coöperating locking devices capable of being readily connected with and disconnected from each other so as to enable the usual pneumatic tire to be quickly and easily attached to or removed from said demountable rim.

A further object of my invention is to construct said demountable rim in such a manner that the same, with the tire in position thereon, may be readily and easily placed upon the wheel and secured thereon by suitable fastening devices.

My demountable rim is preferably made with an inner diameter slightly larger than the outer diameter of the wheel in connection with which it is to be used so that when the parts are assembled, the coöperating interlocking devices will be located in the annular space formed between the demountable rim and the wheel and extend substantially from said demountable rim to the wheel and thus act as a medium for bracing said demountable rim against shocks or jars.

My invention will be more fully described hereinafter and the features of novelty will be pointed out in the appended claims.

Reference is to be had to the accompanying drawings in which—

Figure 1 is a section through the felly, demountable or auxiliary rim and tire, the tire being shown broken away; Fig. 2 is a perspective view of a portion of the demountable rim and Fig. 3 is an inner face view of a portion of the demountable rim.

A represents the felly of the wheel to which spoke B is secured in the customary manner. To the outer periphery of the felly A is secured the usual, rigid rim C which is preferably made of some suitable metal, as for instance steel. This rim extends preferably across the outer periphery of the felly and is held in place by suitable screws or other fastening devices (not shown). An inclined flange D forms part of the rim C and extends completely around the circumference thereof. At intervals the felly A is provided with openings E, which extend completely through it in a direction parallel with the wheel's axis: If desired, one end of these openings may be reinforced with metal plates F suitably secured in position. Bolts G provided with heads G' and having their free ends screw-threaded as at $G^2$ to receive nuts H extend through the openings E. The bolt heads G' are made with projections $G^3$, which project toward the axis of the wheel and have suitable openings to receive screws I which are driven into the felly. The bolts are thus prevented from turning and are also held securely in position in the openings E.

J designates wedge members having apertures through which the bolts G extend, said members being provided with wedge shaped projections J'.

K is a demountable or auxiliary rim formed of two annular separable portions K' and $K^2$ abutting in a plane perpendicular to the axis of the wheel. Section K' is provided with downturned lugs L L preferably formed integral with the section itself, one of the lugs L' being made shorter than the others for the purpose which is hereinafter explained. Section $K^2$ is provided with locking projections M preferably formed integral with said section. As shown in the drawing they extend first downward and then laterally so as to project beneath section K' and are provided with lugs M' which extend circumferentially to engage with the rear surfaces of the lugs L or L'.

In order to assemble the demountable or auxiliary rim, the lugs M' are slipped between lugs L L and then the sections are relatively rotated in opposite directions so that lugs M' pass behind lugs L. The engagement of lugs M' with lugs L and of locking members M with the inner surface of section K' prevents any relative motion of the parts except in a direction opposite to that by which the locking was effected. In order to prevent such movement and unlocking of the members, a wedge piece or other locking member N is provided. When the sections are to be disassembled the wedge is first removed and the parts are then rotated in a direction opposite to that in which they were rotated to lock them together. As one of the lugs L' is somewhat shorter than lugs L, a space L² is provided between said lug and locking member M² for the insertion of a wedge shaped tool so that the parts may be more readily pried apart. This makes it a very easy matter to effect the separation of the sections, even when they have stuck together with rust or dirt.

It will be seen from an inspection of Fig. 1 of the drawings that the inside diameter of the demountable rim K is somewhat greater than the outside diameter of the wheel so that when the demountable auxiliary rim K is in position on the wheel it is spaced from the periphery thereof to form an annular space between itself and the wheel, into which annular space lugs L and locking projections M and lugs M' project, or extend. The said lugs L are of such size as to extend substantially from said demountable rim to the wheel when the parts are assembled and the projections M with the locking lugs M' are of a thickness to similarly extend substantially from said demountable rim to the wheel. Thus when the auxiliary rim is in position on the wheel, these lugs L, projections M and lugs M' form braces to brace the said demountable rim against any tendency to buckle or bend inwardly due to sudden shocks or jars occasioned by an encounter with stones or other obstacles or irregularities in the road. The construction is such that the demountable rim as already stated is spaced from the wheel and the coöperating locking means extend into close proximity to the wheel and engage the same only when subjected to sudden shocks or jars as explained above. Thus the parts being normally spaced, rusting is prevented and yet provision is made for strengthening the structure. A suitable tool may also be inserted in said annular space to force the demountable rim from the wheel if occasion demands. If desired a flat spring O may be attached to the wedge piece N. This spring, by bearing against the rim C, will prevent a loosening of the wedge piece.

In order to attach the tire to the wheel, one of the sections of the demountable or auxiliary rim is laid upon the floor with its locking devices extending upward, and the tire, which may be provided with stiff or with soft beads, is slipped over said section, the bead resting in the hooked portion of the section. The other section is then locked upon the first section in the manner already described the other bead of the tire passing into the corresponding hooked portion. The demountable or auxiliary rim, thus locked together and carrying the tire, is then locked in place upon the wheel by the insertion of the wedge members J, which in turn are fastened down by means of the nut H.

It will be noted that the tire may be fully inflated after it is attached to the demountable rim, and can thus be carried as a spare tire without the necessity of inflating it on the road. It will be noted that the inflation of the tire is not necessary in order to keep the two sections of the rim properly locked together, so that in case of deflation of the tire there is no danger of a separation of said sections. It will also be noted that a stiff bead tire can be readily attached to the demountable or auxiliary rim, whereas with the one piece demountable rims now in actual use the bead must be soft so that it can be pried over and under the hooked portion of the rim. It will also be noted that the locking means are located on the inner surface of the sections forming the demountable or auxiliary rim, so that no additional plate or other means need be provided to protect the tire; and that the two sections are interlocked in such a manner as to enable said sections, with or without tire attached, to be carried separately from the wheel without any danger of their becoming disengaged from one another.

The solution of the demountable auxiliary rim problem depends on the features of my discovery. They are as follows: First; there should be a split rim, i. e. a rim composed of two circular pieces or sections having annular meeting surfaces with no obstructions or interlocking devices along said meeting surfaces. Second; said meeting surfaces should be relatively smooth so that even if rust should form along said surfaces or dirt or other foreign matter should work its way in between said surfaces and tend to bind them together, there will be the minimum amount of resistance toward separating the two rim sections. Third; the meeting surfaces of said sections when assembled should be sufficiently close together to constitute the whole outer surfaces of said sections a smooth unit under normal conditions and yet leave said sections capable of a movement relative to each other (indicated on the drawings by the space on Figs. 1, 2 and 3) i. e. a lateral movement under strains which will scrape off or otherwise loosen rust, dirt or other foreign matter and thus keep the said meeting surfaces normally physically separated. Fourth; a locking device to hold the sections together yieldingly but not rigidly. That is there should be sufficient interlocking to maintain the sections very close together while still allowing just a little play or yield in all directions except one preferably the circumferential movement. In other words no two parts should be rigidly joined and no two parts should be subjected to an unyielding pressure so that a tendency to move in any direction except in a circumferential direction will meet with a minimum resistance. Therefore, if a rock, rut or other irregularity in the road is encountered and strains the rim in any lateral direction, the said rim can yield a bit in the vicinity of the line of junction of the two sections. The relative movement thus produced between the rim sections even though it be very slight, serves to clean and scrape the parts so that said irregularities of the road automatically protect all parts against rusting or other binding together. To obtain the best result no permanent rust or other binding medium should be permitted to form between the meeting surfaces of the rim section K' and K², nor between the contacting surfaces of the rim sections K' and locking projections M nor between the adjacent edges of the lugs L and M'. This result is amply accomplished with my construction. In other words the sections K' and K² and their interlocking projections have the capacity of a vertical and lateral motion when connected, said capacity being normally inactive but active when the wheel rotates and the vehicle is in motion. I thus join two absolutely rigid sections in a yielding manner without the use of any flexible connecting piece but merely by the particular method of joining the parts together as shown and described. It will be noted that as the tire is inflated the air pressure tends to separate said sections in a direction parallel with the wheel's axis and pulls the lugs M' against the lugs L.

I do not desire to limit myself to the exact construction shown in the drawings. For instance, the demountable, or auxiliary rim may be constructed to hold what is known as the Dunlop tire, and stay bolts may be provided, in the well known manner. The wedge N may also be omitted as the parts will be held together by friction.

I claim:

1. A demountable tire-carrying rim composed of two annular members contacting in a plane perpendicular to the axis of the rim, each member being provided with a series of inter-engaging rigid lugs extending from the members toward said axis of the rim.

2. A demountable rim comprising two annular members contacting at their lateral edges, one of said members being provided with a series of inwardly extending lugs, the other member being provided with a corresponding series of lugs which extend inwardly, then laterally beyond said edge and then circumferentially to engage with the rear surfaces of the lugs of the first mentioned member.

3. A demountable wheel rim comprising two annular members provided with inwardly extending interengaging lugs near their abutting edges and a locking member extending between two of said lugs to prevent circumferential movement of one annular member with respect to the other.

4. A demountable tire-carrying rim comprising two annular abutting members provided with rigidly attached lugs near their abutting surfaces, the lugs of one member extending inwardly, the lugs of the other member extending first inwardly, then laterally toward the first mentioned member and between the lugs of said first mentioned member and then circumferentially behind the lugs of said first mentioned member.

5. A demountable rim composed of two sections placed edge to edge and forming when so placed a substantially continuous even outer surface for the tire, each section being provided with rigid lugs extending radially from the side edges of each section and forming a continuation thereof and adapted to interlock within the inner circumference of the rim.

6. A demountable rim composed of two separable sections having outer surfaces which when united form a substantially continuous even surface for the tire, each section being provided with a series of rigid projections, projecting within the inner circumference of the rim and adapted to interlock with each other, the spaces between the projections on one section being but slightly larger than the length of each projection on the other section, whereby a maximum of holding surface may be provided.

7. In combination, a wheel, a demountable tire-carrying rim adapted to be removably secured to said wheel and annually spaced from the periphery thereof and comprising two sections, means carried by each section for holding a tire, interlocking means on each section located in said annular space when the parts are assembled and extending substantially from the demountable rim to the wheel and tending to brace said rim and means for securing said demountable tire-carrying rim on the wheel.

In testimony whereof I have hereunto set my hand in the presence of two subscribing witnesses.

JOSEPH M. GILBERT.

Witnesses:
FRITZ V. BRIESEN,
ELMER G. MILYOUNG.